No. 811,004. PATENTED JAN. 30, 1906.
J. E. TUTTLE & J. MacLEAN.
MACHINE FOR CUTTING WOODEN DISHES.
APPLICATION FILED AUG. 21, 1903.

WITNESSES:

INVENTORS

No. 811,004. PATENTED JAN. 30, 1906.
J. E. TUTTLE & J. MacLEAN.
MACHINE FOR CUTTING WOODEN DISHES.
APPLICATION FILED AUG. 21, 1903.

WITNESSES:
INVENTORS

Fig. 13.

UNITED STATES PATENT OFFICE.

JAMES E. TUTTLE, OF WATERTOWN, AND JAMES MacLEAN, OF BOSTON, MASSACHUSETTS, ASSIGNORS TO LEVI L. ROWE, OF BOSTON, MASSACHUSETTS.

MACHINE FOR CUTTING WOODEN DISHES.

No. 811,004.

Specification of Letters Patent.

Patented Jan. 30, 1906.

Application filed August 21, 1903. Serial No. 170,278.

*To all whom it may concern:*

Be it known that we, JAMES E. TUTTLE, of Watertown, in the county of Middlesex, and JAMES MACLEAN, of Boston, in the county of Suffolk, State of Massachusetts, have invented a new and useful Improvement in Machines for Cutting Wooden Dishes, of which the following is a specification.

Our invention relates to a machine the product of which is a one-piece seamless dish or the like, which is, so to speak, "scooped off" of the end of a block of wood and takes its outline from the shape of the cross-section of the block and acquires its thickness from the length of the feed, its depth and general shape being given to it by reason of the shape of the knife-blade by which it is cut.

Our invention consists in a machine having the characteristics above expressed, and preferably so constructed that there may be a plurality of knife-blades as well as a plurality of blocks, all of the blocks being cut by each of the blades and each of the blocks being capable of being withdrawn from reach of the knife-blades for renewal or otherwise without stopping the machine or in any way interfering with the action of the knife-blades upon other blocks in the machine.

The invention will be understood by reference to the drawings, in which we have shown the preferred embodiment of our invention. The cutter mechanism is shown entire. Provision is made, however, in the machine for the feeding of three blocks to the cutter upon three separate sides of the machine. The mechanism for feeding one of these blocks is shown entire, and places are indicated where other block-feeding mechanisms may be placed, if desired.

In the description we shall use the term "cutter" or "cutter-head" to indicate the dish-cutting implement and the term "trimmer" or "trimmer-knife" to indicate the blades by which the face of each block is trimmed as below described.

A is the bed or table, having below it and cast in one piece therewith a triangular frame A', which in turn is supportd by legs $A^2$.

$A^3$ is the main shaft, the lower end of which (not shown) is suitably supported, its upper end being journaled in a bearing supported by brackets $A^4$. The upper end of this shaft $A^3$ carries a pinion $A^5$, which meshes with a gear B. The table A has a circular opening near its center, in which the gear B is supported in the following manner: The gear B is bolted by bolts $b$ to the lower end of an annular bearing D, which is shaped in cross-section like an inverted U, its horizontal portion $d$ resting upon a series of antifriction-rolls $d'$, preferably conical in shape, which support the annular bearing D upon a suitable annular groove $c$ in the table A. The periphery $d^2$ of the annular bearing D carries a cam-rib $d^3$ to operate the trimming-knife L, as will be explained below. Upon the bearing D is mounted one member E of the cutter-support. To this member of the cutter-support is attached by screws $f$ the lower edge of the head F, the other edge thereof being attached by screws $f'$ to the other member E' of the cutter-support. The member E' of the cutter-support is disk-like in character and is centered by means of a frame G, mounted on supports G', mounted on the table A and having an opening in its center in which is a bearing $g$, said bearing being attached to the frame G by screws $g'$. In the center of this bearing (the interior of which is threaded) is a screw $g^2$, the lower end of which is pointed and the upper end of which carries a set-nut $g^3$, and it is also provided with means whereby the screw may be set down to fit into a suitable center in the upper portion E' of the cutter-support, so as to maintain the axis of the knife in proper position. It will be noted that the radius of the gear is less than that of the bearing for the cutter-head, so that the cutter-head has greater stability than if the reverse were true. As far as explained provision is thus made for the rotation of the cutter.

F is the hollow cutter-head, which is substantially cylindrical, having two openings, each located opposite the other. The edge of the cutter-head bordering each opening is bent outwardly somewhat, (see Fig. 9,) the advancing end of each edge serving to brace the knife-blade and the rear end thereof assisting in directing the cut-off dish through the opening F' into the chamber within the cutter-head, through which it may fall into a basket or other receptacle under the machine.

$F^2$ $F^2$ are the cutter-blades, each of which is attached at each end to one member of the cutter-support, each blade being shaped to conform to the desired shape of the dish to be cut. The middle of the rear edge of each blade is braced by a strap or brace $F^3$, the main portion of which is bolted, as at $f^2$, to the cutter-head. The rotation of this cutter-head therefore cuts off a dish, the thickness of which depends on the length of feed of the block from which it is cut.

The clamping and feeding mechanism will now be described.

Figure 1:
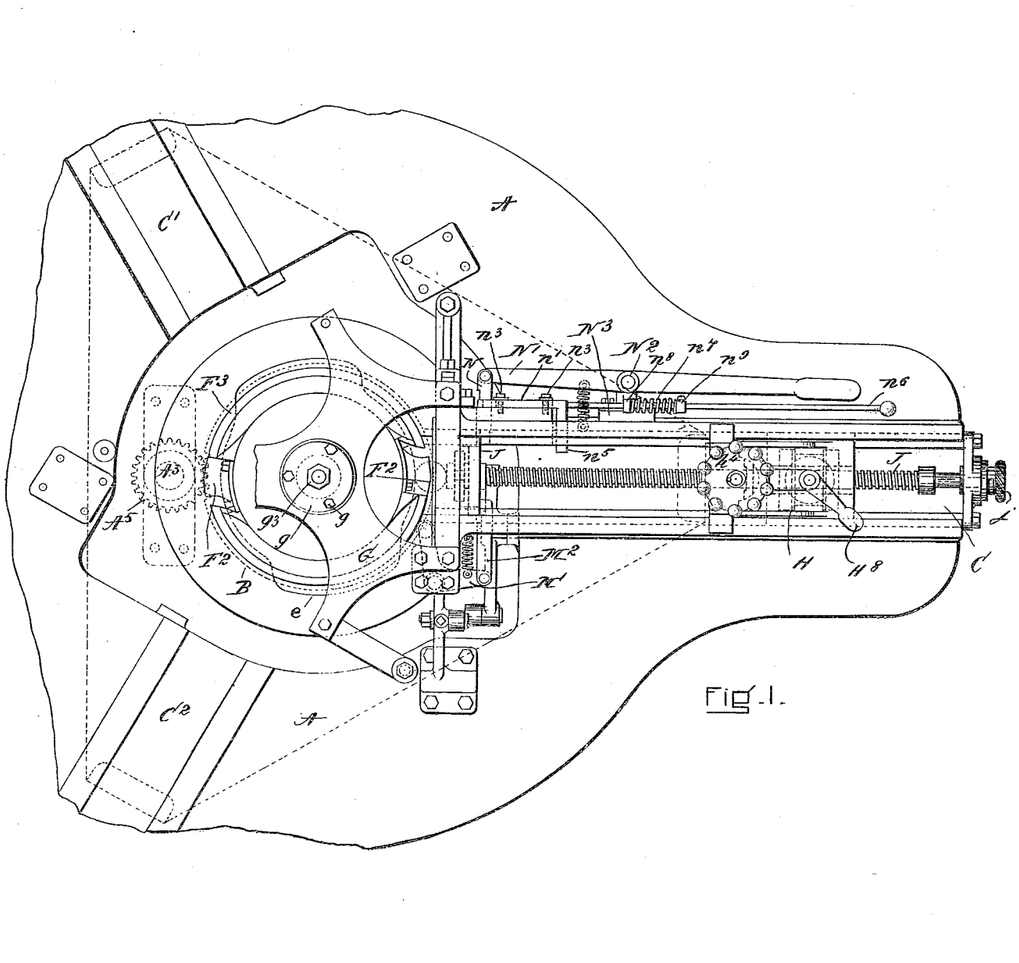
Figure 1 is a plan showing the essentials, as above described, of a machine embodying our invention.
Figure 2:
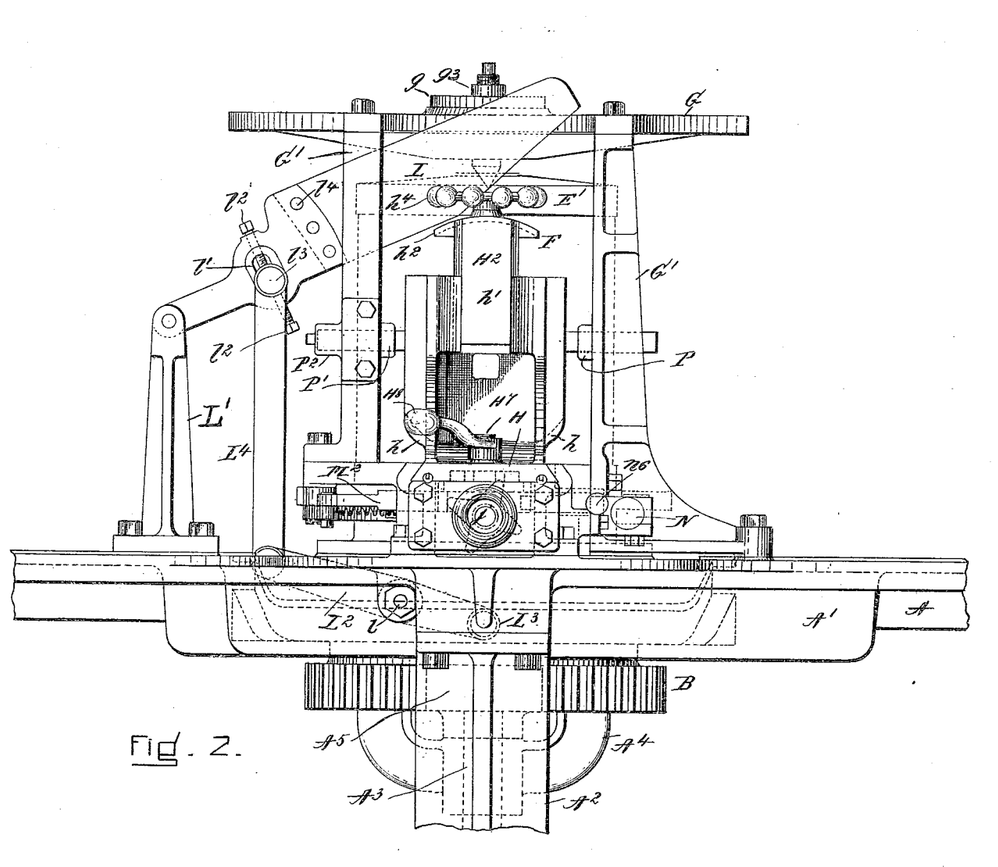
Fig. 2 is a similar end elevation taken from the right side of the machine shown in Fig. 1.
Figure 3:
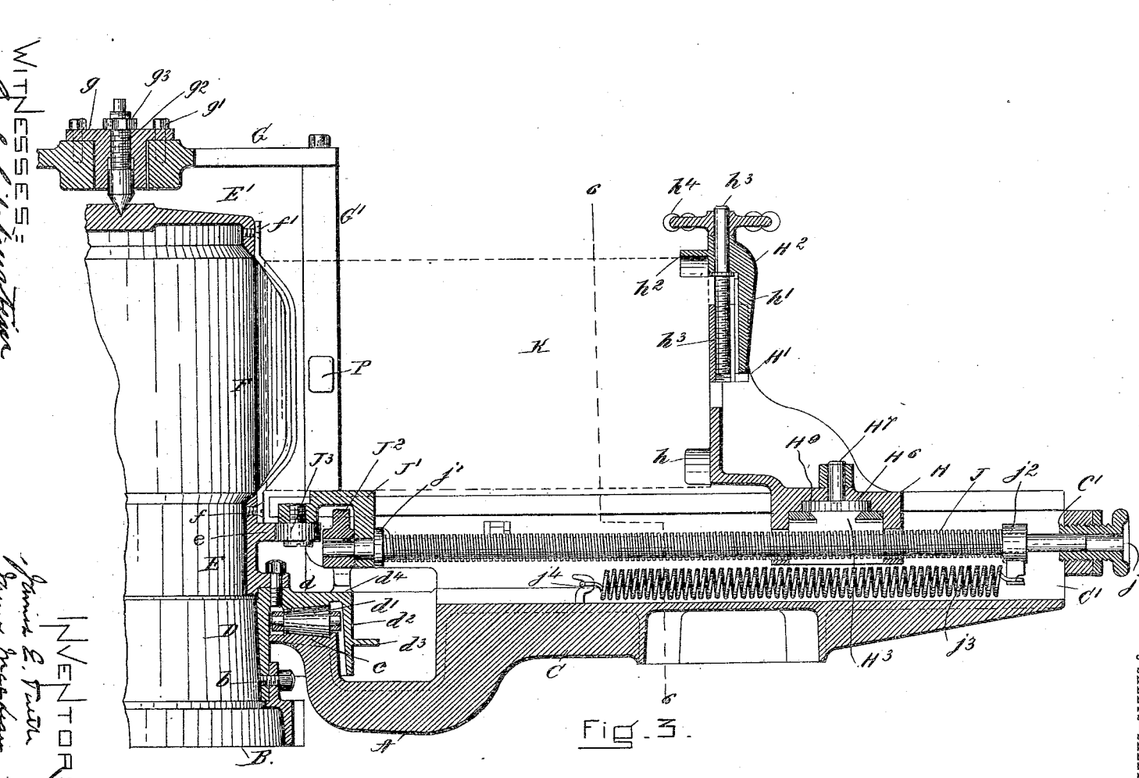
Fig. 3 is an enlarged longitudinal section of the block-feeding mechanism.
Figure 4:
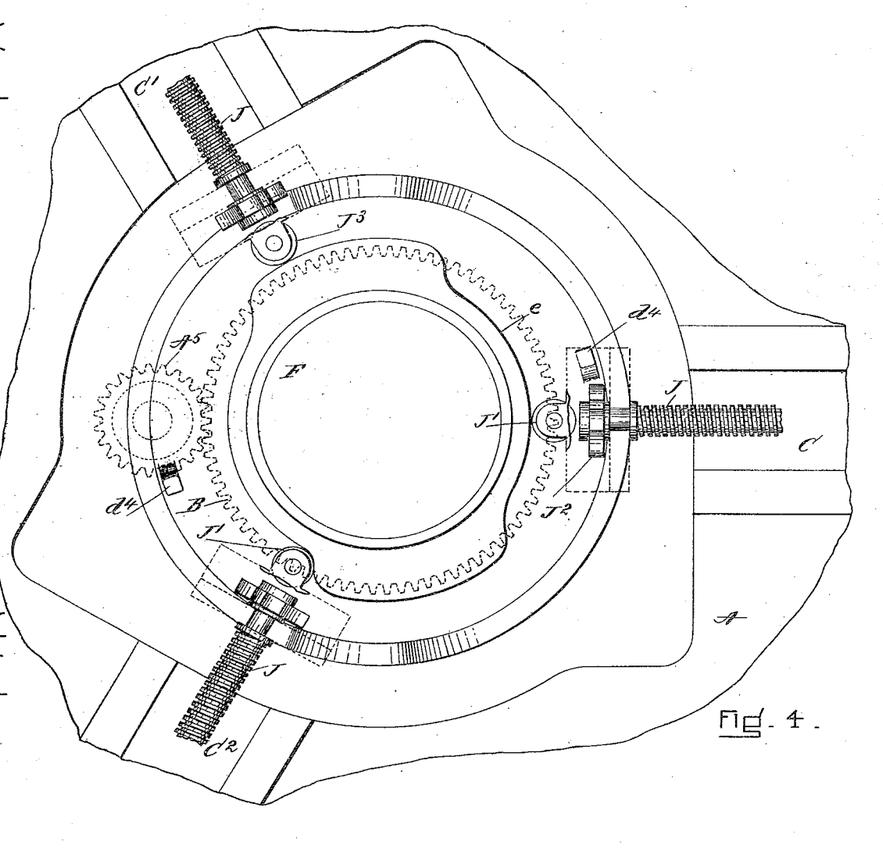
Fig. 4 is a plan of the rotating-cutter support, the upper portion thereof being omitted.
Figure 5:
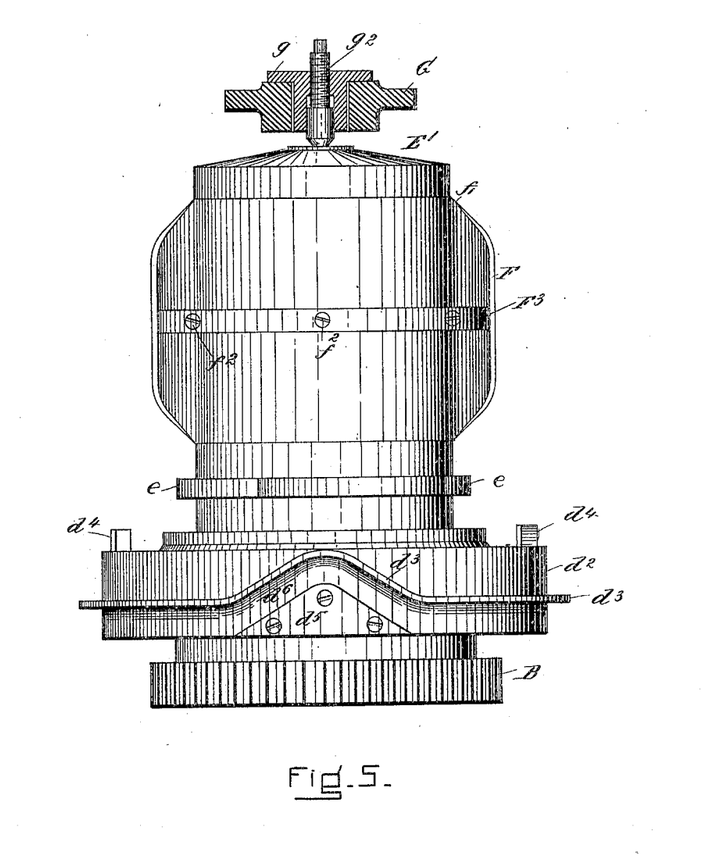
Fig. 5 is an elevation of the cutter.
Figure 6:
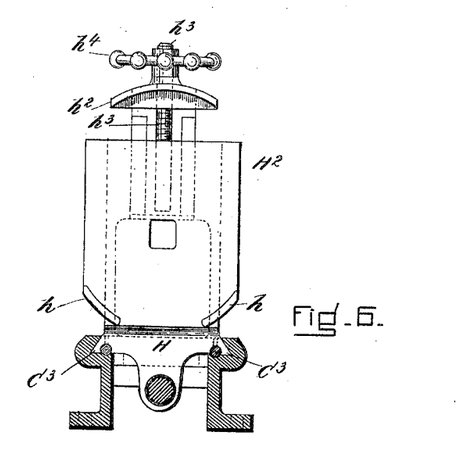
Fig. 6 is a sectional detail on line 6 6 of Fig. 3, showing the block-carrier.
Figure 7:
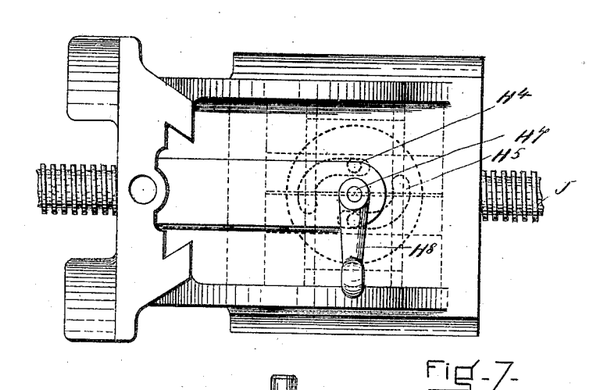
Fig. 7 is a detail plan of the block-carrier, the upper clamp being omitted.
Figure 8:
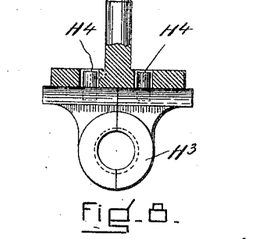
Fig. 8 is a detail showing the clamping-nut forming part of the feeding mechanism for the block-clamp.
Figure 9:
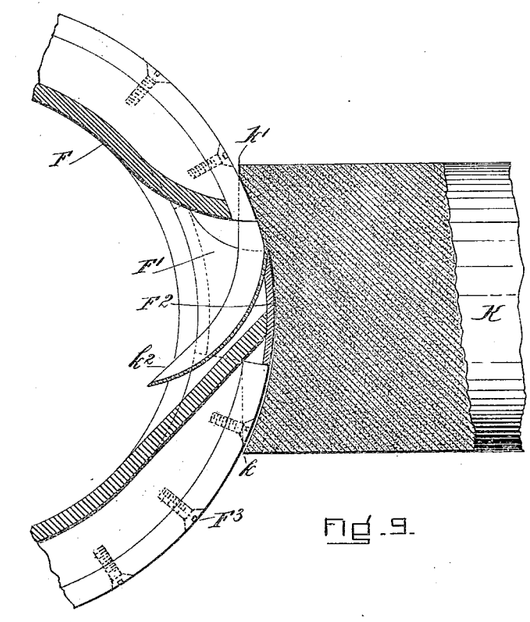
Fig. 9 is a detail showing the action of the cutter-blade in cutting off a dish from the block.
Figure 10:
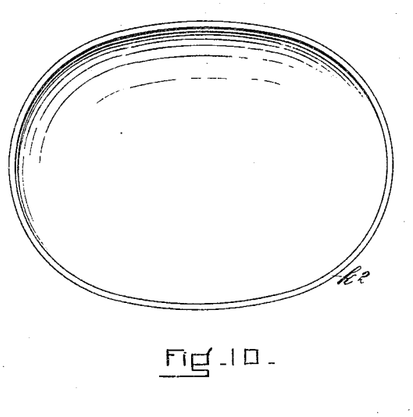
Fig. 10 is a plan view of the dish, and Fig. 11 a section thereof.
Figure 11:
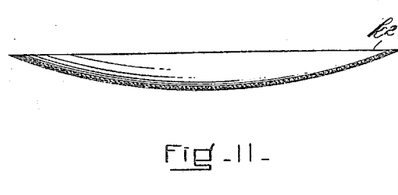

The block-feeding mechanism comprises both a feed and a clamp. For this purpose the table A has radial openings C C' $C^2$, in the walls of each of which are provided dovetailed grooves $C^3$, in which slides a carrier H. As the carriers H are all alike, only one of them is shown in the drawings, together with the mechanism for feeding it. A portion of the feeding mechanism of the other carriers is shown in Fig. 4. Each carrier H has mounted on its front end a post H', on the lower front face of which are two ears $h$, which serve to receive the lower edge of the rear end of the block. This post also has at its upper end vertical ways $h'$, the positions of which are indicated in Fig. 3, in which slides vertically the clamp $H^2$, provided with a clamping-surface $h^2$ opposite the ears $h$. A clamping-screw $h^3$, provided with a suitable handling wheel $h^4$, passes down through the clamp into an opening in the upper end of the post H', which is threaded to receive it, this construction being such that upon rotating the wheel $h^4$ in either direction the surface $h^2$ is brought nearer to or farther from the ears $h$, so that a wooden block K (indicated by dotted lines) may be clamped in place. This carrier H is fed in the following manner: J is a feed-screw, the outer end of which is smooth to slide in the screw $j$, which screws into the edge $c'$ of the table. The farther or inner end of the feed-screw J is also smooth and passes through a supporting-block J', which slides in the grooves $C^3$. The screw J carries at its extremity a four-armed wheel $J^2$. A washer $j'$ lies between the threaded portion of the feed-screw J and the face of the supporting-block J', and at its outer end there is a collar $j^2$, which is connected by a spring $j^3$ with a hook $j^4$ and mounted on the table A. The supporting-block J' also carries a cam-roll $J^3$, which bears against a cam-surface $e$ on the knife-holder E. The spring $j^3$ holds the cam-roll $J^3$ against this cam-surface $e$. The shape of the cam $e$ will be understood from Fig. 4, where it will be seen that it has two projections opposite each other. In the machine shown in the drawings provision is made for only two cutter-blades. The projections on this cam-surface $e$ are for the purpose of causing the block to be pushed back after a dish has been cut from it within reach of the trimming-knife L. On the annular bearing D are also two ears $d^4$, located opposite each other and so placed that as the cutter rotates each will in turn pass under the armed wheel $J^2$ and turn it through a quarter of a revolution, the turning of this armed wheel turning the feeding-screw, and hence feeding the carrier forward a predetermined distance, for the reason that the carrier has a nut $H^3$ on its under surface which normally fits the screw J. This nut $H^3$ is made in two parts, which are adapted to separate crosswise of the carrier H in suitable dovetailed grooves, as shown in Fig. 3. Each part has a vertical pin $H^4$, which projects upward into a cam-groove $H^5$ in a circular disk $H^6$, mounted in the carrier H, said disk having a post $H^7$, in which is a handle $H^8$, by which it may be turned. The purpose of this construction is to provide a convenient means whereby the two parts of the nut $H^3$ may be separated when it is desired to withdraw the carrier for the purpose of inserting a new block or for any other reason. When the parts of the nut $H^3$ are together, however, the rotation of the feed-screw J in the manner and direction above described will cause the block to be fed forward. In Fig. 9 is shown the block K, and it is also shown in outline in Fig. 3. In Fig. 9 the dish is partly detached from the block, and it will be noted that the edge $k$ of the block from which the dish has been detached is sharp, while the other edge $k'$ of the block from which the dish has not been detached has a narrow surface which forms a finish to the dish substantially at right angles to the length of the block. This is desirable in order that the edge of the dish K' may be flat, as indicated at $k^2$. It is necessary, therefore, that the edge of the block be trimmed after each dish has been cut from it and before being presented to the cutter for another cut. For this purpose there is shown in Fig. 2 a trimming-knife, (marked L.) It is pivotally mounted in a standard L' at its rear end, and it is operated by means of a rocking lever $L^2$, pivoted at $l$ to suitable ears on the under side of the table. This rocking lever $L^2$ has a cam-roll $L^3$, which rests against the under surface of the cam-rib $d^3$. The other end of the rocking lever $L^2$ is connected by a connecting-link $L^4$ to the trimming-knife L, and we prefer that this connection shall be adjustable in order to allow for the wear to the knife due to grinding and other reasons. For this purpose we have provided the knife L with a slot $l'$ and set-screws $l^2$, so that the pin $l^3$, which passes through the upper end of the link $L^4$, may be clamped between the set-screws $l^2$ and its position within the slot regulated thereby as may be necessary. If preferred, the knife may be made, as shown in the drawings, in two pieces, the front portion being the blade and the rear portion the handle, the two being connected by rivets or otherwise, as indicated at $l^4$. In order to depress this knife and cause it to perform its function of trimming the face of the block, means, such as the wedge-shaped pieces $d^5$, are combined with the cam-rib $d^3$ to form at the necessary portions of the circumference of the annular bearing D the cam-groove $d^6$. This knife has, as will be seen, a vertical movement, and its path of movement cannot be such as to interfere with the operation of the knife-blade. For this reason it is necessary after the cutting off of each dish that the block be removed into proper position with relation to the trimming-knife, and it is for this purpose that the cam-surface $e$ on the knife-holder E and the cam-roll $J^3$ on the feed-block $J'$ are provided, the relation of these parts being such that when each projecting surface of the cam $e$ moves against the cam-roll $J^3$ it pushes the feed-screw J and the carrier H rearward against the force of the spring $j^3$ and holds it in a rearward position until the trimming-knife L has had time to descend and trim the block and withdraw.

We prefer to so locate the collar $j^2$ and the inner end of the screw $j$ with relation to each other that they shall come together as the feed-screw J is moved outwardly, the screw $j$ serving as a stop to prevent the action of the cam $e$ from throwing the feed-screw too far rearwardly should the machine be moving rapidly enough. A leather washer may be interposed as a cushion between the collar $j^2$ and the end of the screw $j$, if thought desirable.

Figure 12:
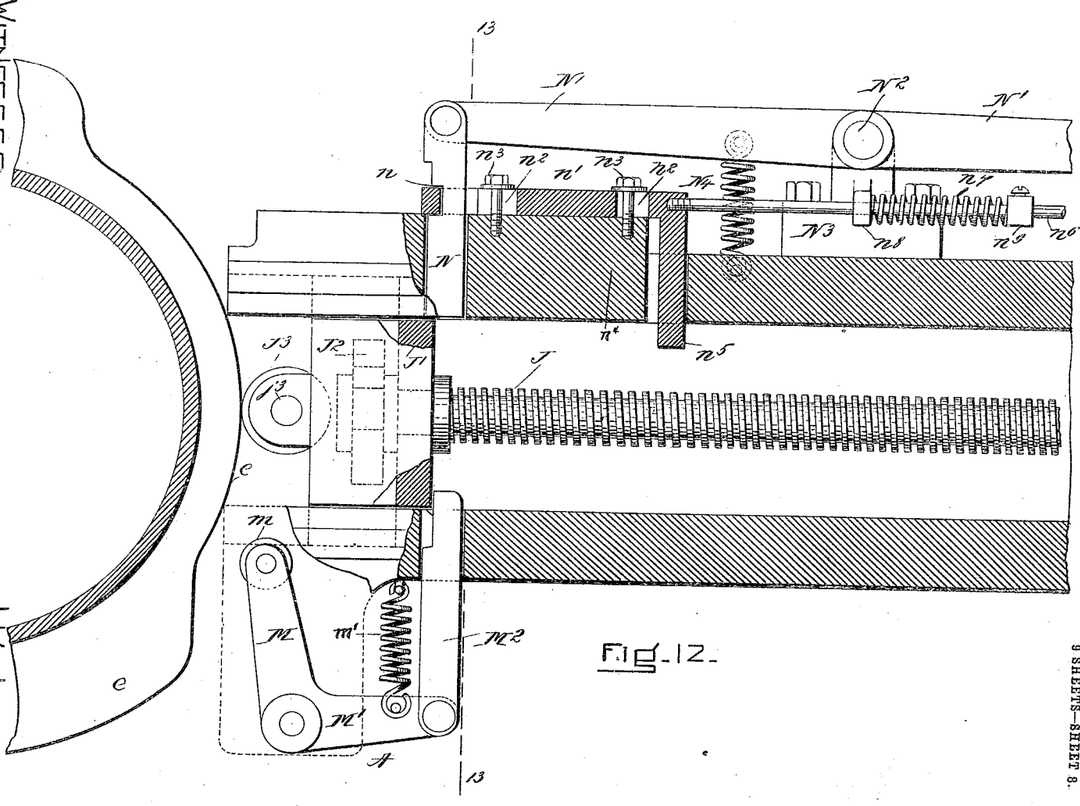
Figs. 12 and 13 show details of the stop mechanism.
Figure 13:
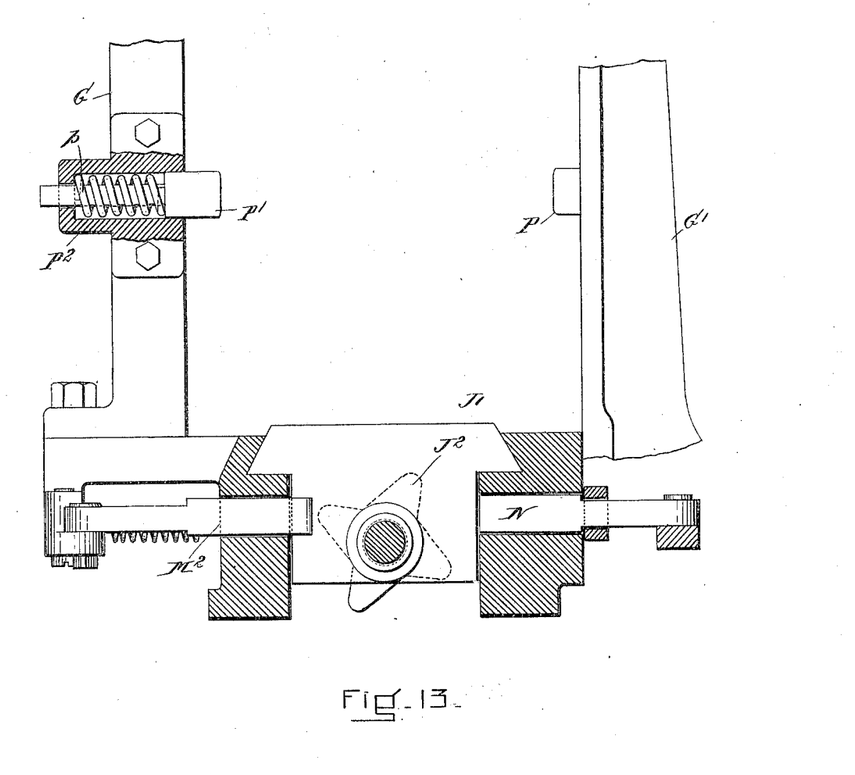

In order that the block K may be held positively in its forward position against the action of the dish-cutting knife, we have provided a lock, which will be understood especially from examination of Figs. 12 and 13. A bell-crank lever is mounted on the table A. One arm M of this bell-crank lever carries a roll $m$. The other arm $M'$ of this lever is pivotally connected to the locking-arm $M^2$. It will be noted that the roll $m$, as shown in Fig. 12, lies in the path of the swelling surface of the cam $e$, so that the cam $e$ will strike the roll $m$ before it strikes the cam-roll $j^3$. A spring $m'$ holds the arm M in its normal position. (Indicated in Fig. 12.) The operation of these parts is as follows: The locking-arm $M^2$ as it lies in front of the feed-block $J'$ holds the feed-block against any rearward movement which might be given to it by the engagement of the cutter which cuts the dish from the block during its cutting movement. When this movement is over, however, and it is desirable that the block be removed into a position under the trimming-knife, the swell of the cam $e$ strikes the roll $m$ and causes it to withdraw the locking-arm $M^2$ against the force of the spring $m'$, and thus allow the swell of the cam $e$ when it strikes the cam-roll $j^3$ to push back the block so that its front edge comes in proper relation to the trimming-knife L, so that this trimming-knife may properly trim the edge of the block for the next dish. At this instant the trimming-knife descends and cuts off the edge of the block, the cam holding the block in its outward position against the force of the spring $j^3$.

It is desirable that this machine shall have a stop-motion by means of which it may be stopped automatically when the block has been practically consumed and also such that it may be stopped at any time by hand. In this respect we believe our machine differs from other machines, in that instead of its being necessary to stop the entire machine whenever the block is removed it is possible to stop the feed of any one block, so that where, as is shown in the drawings, the machine is intended to be provided with three block holding and feeding mechanisms either one of these holding and feeding mechanisms may be put out of commission independently of all the others and independently of the cutting mechanism. This stop mechanism is shown in Figs. 12 and 13. It consists of a locking-arm N, pivotally connected to the end of a lever $N'$, which lever is pivoted at $N^2$ to a support $N^3$, mounted on the table A. The locking-arm is under control of the spring $N^4$, the tendency of which is to cause the locking-arm N to move inward—that is, across the path of the feed-block $J'$. This locking-arm N is notched, as shown at $n$ and as shown in Fig. 12. One wall of this notch rests upon a slide $n'$, which is slotted, as shown at $n^2$, screws $n^3$ passing through each slot and into the portion $n^4$ of the side wall of the radial opening C, holding its slide in proper relation thereto and to the locking-arm N and yet allowing it to slide. We prefer that the rear end $n^5$ of this slide shall project through a suitable opening in the side wall of the opening C, which shall serve as a stop for the slide both in its rearward and forward movement, and this rear end of the slide lies across the path of the carrier H, so that when the carrier strikes it, as it will when a large part of the wooden block has been cut away and merely a fragment left which is not worth cutting further, and pushes it forward, thus disengaging it from the slide N and allowing the slide, impelled by the spring $N^4$, to move in front of the block $J'$. This action will take place only of course when the block $J'$ is in its outward position. In order to accomplish the same result by hand, a rod $n^6$ is provided, by means of which the slide $n'$ may be pushed forward at any time against the force of a spring $n^7$, which lies against a collar $n^8$, mounted on the support $n^3$, and an adjustable collar $n^9$, mounted on the rod $n^6$. The operation of the machine having been stopped to remove a wooden block which has been cut too short in the manner referred to, all that is necessary is to turn the handle $H^3$ and so open the nut $H^3$ that it will lose engagement with the feed-screw J, when the carrier H can be pushed back by hand, the remnant of the block removed, and a new block put in its place, after which the carrier may be slid to that portion of the arm $C'$ where the front face of the block will be brought in proper relation both to the trimming and to the cutter knives. Whether the feed has been stopped by hand or automatically, it may be allowed to proceed again by withdrawing the stop-slide N by means of the lever $N'$, which is provided with a handle for this purpose.

As intimated above, an important feature of our machine is its ability to operate the cutter continuously and to change any wooden block without interfering with the operation of the cutter on the other blocks in the machine. We have shown but one set of block-feeding mechanisms. The mechanisms to be fitted into the other slides, &c., are identical in structure, and it would seem to be unnecessary to show more. This feature of our machine can of course be combined with other forms of cutters, especially of the rotary character, and it is perfectly evident that the cutter shown may be used with feeds of a different character. We believe, however, we have shown in our drawings the best form of apparatus embodying our invention—certainly the best which we now know; but these details may be changed very largely without departing from the spirit of our invention.

In the operation of this machine the wooden blocks from which the dishes are to be cut are each placed in one of the carriers and clamped. The rotary cutter may be rotated during the time while this clamping operation is going on. The separable screw of the carrier being loose, the carrier is moved forward until the front of the block is approximately within reach of the knives, and then the separable nut is clamped so that it will engage the feed-screw. The carrier being locked in place, the cutter-blade cuts off from the front of the block the veneer which forms the dish. When this has taken place, the locking-arm $M^2$ is withdrawn, because of the engagement of the cam-roll $m$ with the cam-surface $e$. This allows the cam-surface $e$ in its further movement to push back the carrier into position where it may be reached by the trimming-knife in its descent, this movement being owing to the engagement of the cam-roll $J^3$ with the swell on the cam-surface $e$. The trimming-knife then descends, shaving off or trimming the edges of the dish. Thereafter when the cam-surface $e$ has passed the cam-roll $J^3$ the spring $a^3$ pulls the carrier forward again, and just before the cutter-knife strikes the block to cut out a new dish the wheel $J^2$ is engaged by the ear $d^4$, so that the screw J is turned and the carrier is fed forward the distance represented by a quarter of a turn of the screw. This operation is repeated until the carrier in its forward movement strikes the arm $n^5$ of the slide, which unlatches the slide-arm N and allows it when the carrier is next in its rearward position to fall in front of the sliding block $J'$ and prevent any further engagement of the block with the cutter-blade.

As it is desirable that the front end of the wooden block shall be stationary, especially against the action of the cutter in cutting out a dish, we have provided upon the posts G upon each side of the line of movement of the block K means for this purpose. On the one side is a stationary rest P, against which the block is cut. On the other side is a spring-rest $P'$, which moves lengthwise in a recessed piece $P^2$, fastened on one side of one of said uprights $G'$. A spring $p$, coiled around the shank of the rest $P'$ and bearing at its outer end against a broadened surface of the rest and at its inner end against the rear of the recess referred to, serves to keep this rest $P'$ in its outward position.

The construction above described is believed to be superior to all constructions heretofore known, in that the application of power to all parts of the machine is concentrated within a small compass, the cutter-head carrying upon its supporting portion not only the element by means of which power is applied to it, but also the elements by which it causes the operation at the proper time of the other elements of the machine.

What we claim as our invention is—

1. In a dish-cutting machine, a rotary cutter, a trimming-knife, and means whereby each is operated, a carrier and means whereby it is given an intermittent progressive feed toward the cutter-head, and means whereby between each feed movement it is given a reciprocating movement rearward to register with said trimming-knife, and forward after the operation of said trimming-knife, as set forth.

2. In a dish-cutting machine, in combination with a block-feed and a trimming-knife adapted to shave off the front of the block, means for cutting a dish from said block comprising a rotary cutter-head, a support therefor having a cam-surface whereby said block-feed is moved from a place in register with said rotary cutter to a place in register with said trimming-knife, and a cam-surface, and means operated thereby whereby said trimming-knife is caused to operate, as described.

3. In a dish-cutting machine, in combination, a rotary cutter-head, a support therefor located beneath said cutter-head, and means located above said cutter-head for centering it, and means for supporting said cutter-head support comprising a stationary table having bearings thereon adapted to engage with a prepared surface on said cutter-head support, said table also carrying a suitable gear whereby power may be applied thereto to rotate said cutter-head, as set forth.

4. In a dish-cutting machine, a cutter-support comprising two opposing surfaces, a cylindrical cutter-head connecting said surfaces, a bow-shaped knife also connecting said surfaces and provided with a bracing-strap mounted on said cutter-head, the front end of said bracing-strap engaging the rear edge of said knife, as described.

5. In a dish-cutting machine, a rotary cutter and a feed mechanism comprising a carrier having a nut forming a part thereof, a screw the thread of which is adapted to lie within said nut, said screw being supported to move endwise with said carrier, and means mounted upon said cutting-head, whereby an endwise movement is given to said screw to move said carrier toward and from a position where the block carried by it will be engaged by the cutter, as set forth.

6. In a dish-cutting machine, a rotary head carrying one or more knives, a reciprocating carrier, means for reciprocating said carrier comprising a cam rigidly mounted on said cutter-head, and located to engage said carrier, as shown.

7. In a dish-cutting machine, a rotary cutter-head carrying one or more knives, a reciprocating carrier, means whereby said carrier is fed comprising a feed-screw having means for turning it, said feed-screw being supported at each end, and means located on said cutter-head and adapted to engage the adjacent end of said feed-screw to reciprocate said carrier, as described.

8. In a dish-cutting machine, a rotary cutter-head carrying one or more knives, a carrier, means whereby said carrier is fed comprising a feed-screw having means for turning it, one element of which is located on said feed-screw, and the other element of which is located on said cutter-head, and means whereby said carrier is withdrawn after the action of the cutting-tool, said withdrawing means being located on the cutter-head, as set forth.

9. In a dish-cutting machine, in combination, a rotary cutter-head, a carrier adapted to be fed toward said cutter-head, its feeding mechanism comprising a screw suitably supported at each end and adapted to slide in its supports, means located on said cutter-head and adapted to engage the edge of the front support of said screw, whereby said screw may be pushed away from the axis of the cutter-head, and means for returning said screw to its forward position, as set forth.

10. In a dish-cutting machine, a rotary cutter, a carrier, a feed-screw connected with said carrier, a supporting-block adapted to support the front end of said feed-screw, means for reciprocating said carrier and said feed-screw toward and from said cutter-head, and means for locking said carrier when in its forward position, comprising a locking-bar adapted to engage the rear end of said supporting-block, and means for operating it, as and for the purposes set forth.

11. In a dish-cutting machine, a block-carrier, a trimming mechanism whereby the face of said block is shaved, a cutting mechanism whereby a dish is thereafter cut therefrom, means whereby said carrier is brought alternately into position so that the block carried by it will be alternately trimmed and have a dish cut from it, and means whereby said carrier is locked in its forward position comprising a sliding piece connected to said carrier, a lever carrying a sliding arm, and means whereby said lever is moved to carry said arm away from contact with said sliding piece, comprising a cam-surface connected with said cutting mechanism and adapted to engage said sliding arm-lever as described.

12. In a dish-cutting machine, in combination with a dish-cutting knife and a trimming-knife, and means whereby each is operated, a carrier and means whereby it is fed forward progressively, and means whereby it is also given a reciprocating movement forward and back, a slide-pin normally lying across the path of said carrier, and adapted to be engaged thereby, and a latch located to be engaged and normally retained in a rearward position by said slide, and means whereby said latch when out of engagement with said slide will be moved forward into the path of said carrier, as set forth.

13. In a dish-cutting machine, in combination with a dish-cutting knife and a trimming-knife, and means whereby each is operated, a block-carrier and means whereby it is fed progressively forward and is also reciprocated forward and back, means located in the path of the carrier adapted to be engaged thereby, whereby the means for accomplishing the progressive feed of said carrier will be thrown and maintained out of operation, as set forth.

14. A cutter-head support and means whereby it is supported and rotated comprising a table provided with a central opening and an annular recess, an inverted-U-shaped bearing, one leg of which is adapted to set into said recess and the other into said table-opening, and friction-rollers located between said inverted-U-shaped bearing and the upper surface of the edge of said table surrounding said opening, said inverted-U-shaped piece also carrying an annular gear, as described.

15. A revolving cutter-head provided with one or more cutters, a cam mounted on said cutter-head, and located below the same, in combination with a carrier adapted to be reciprocated toward and from said cutter-head, and means to engage said cam, whereby the said carrier may be intermittently reciprocated, as described.

16. In a dish-cutting machine, a cutter-head having a suitable support carrying one or more ears, a carrier mounted upon a feed-screw, the front end of said feed-screw being provided with an armed wheel, the arms of which are located to engage with the ears on said cutter-head support, as described.

17. In a dish-cutting machine, a cutter-head provided with one or more cutters, and one or more straps, each strap extending rearward from the rear of each cutter to within a short distance of the next cutting edge, as shown.

18. In a dish-cutting machine, a stationary table provided with a central opening having an annular supporting edge, a rotary cutter-head having a bearing-surface running on said supporting edge, means for causing the rotation of said cutter-head, means for feeding the block thereto in a line at right angles to the axis of the cutter-head.

19. In a dish-cutting machine, a stationary table provided with a central opening having an annular supporting edge, and a cutter-head having a bearing-surface running on said supporting edge, said cutter-head carrying means such as a gear whereby it may be rotated, the radius of said rotating means being less than the radius of said bearing-surface, whereby greater stability is given to the cutter-head while in operation, in combination with means for feeding a block to said cutter-head in a plane at right angles to said cutter-head and above the plane of said gear, as set forth.

20. In a dish-cutting machine, a table having an annular way thereon, an annular member fitted in said way and having an annular bearing-surface for engagement therewith, a camway on said annular member, a cutting-head carried by said annular member, and a trimming-knife in connection with said cam to be operated thereby across the face of said head.

21. In a dish-cutting machine, a table having an annular way thereon, an annular member fitted in said way and having an annular bearing-surface for engagement therewith, an annular driving-gear on said annular member, a camway on said annular member, a cutting-head carried by said annular member, and a trimming-knife in connection with said cam to be operated thereby across the face of said head.

22. In a dish-cutting machine, a stationary table provided with a central aperture, a cutter-head located within said aperture and having a bearing-surface engaging one edge thereof, a block-feeding mechanism and a block-trimming mechanism, both mounted on said table, and separate means, as described, located on said cutter-head, whereby said block-feeding mechanism and said block-trimming mechanism may each be operated, as set forth.

JAMES E. TUTTLE.
JAMES MacLEAN.

Witnesses:
M. E. FLAHERTY,
SAUL SIPPERSTEIN.